United States Patent
Dhillon et al.

(10) Patent No.: US 11,017,157 B2
(45) Date of Patent: May 25, 2021

(54) GROUP PATTERN BASED ELECTRONIC DICTIONARY MODIFICATION AND PRESENTATION

(71) Applicant: INTERNATIONAL BUSINESS MACHINES CORPORATION, Armonk, NY (US)

(72) Inventors: Jill Dhillon, Austin, TX (US); Michael Bender, Rye Brook, NY (US); Jeremy R. Fox, Georgetown, TX (US); Kulvir Singh Bhogal, Fort Worth, TX (US)

(73) Assignee: International Business Machines Corporation, Armonk, NY (US)

(*) Notice: Subject to any disclaimer, the term of this patent is extended or adjusted under 35 U.S.C. 154(b) by 8 days.

(21) Appl. No.: 16/412,516

(22) Filed: May 15, 2019

(65) Prior Publication Data
US 2020/0364292 A1 Nov. 19, 2020

(51) Int. Cl.
*G06F 17/00* (2019.01)
*G06F 40/166* (2020.01)
(Continued)

(52) U.S. Cl.
CPC ........ *G06F 40/166* (2020.01); *G06F 16/9038* (2019.01); *G06F 16/90324* (2019.01);
(Continued)

(58) Field of Classification Search
CPC .. G06F 40/166; G06F 16/9038; G06F 40/242; G06F 40/284; G10L 15/26
(Continued)

(56) References Cited

U.S. PATENT DOCUMENTS 6,598,022 B2   7/2003   Yuschik
7,487,095 B2   2/2009   Hill
(Continued)

FOREIGN PATENT DOCUMENTS

WO   2008000739 A2   1/2008

OTHER PUBLICATIONS

Carey, Scott; Does Amazon Alexa or Google Home listen to my conversations; TechWorld; May 25, 2018; https://www.techworld.com/security/does-amazon-alexa-listen-to-my-conversations-3661967/; 4 pages.
(Continued)

*Primary Examiner* — Stephen S Hong
*Assistant Examiner* — Matthew J Ludwig
(74) *Attorney, Agent, or Firm* — Schmeiser, Olsen & Watts; Michael A. Petrocelli

(57) ABSTRACT

A method and system for using target audience based attributes for modifying an electronic dictionary is provided. The method includes detecting a communication application being enabled via an electronic device. In response, electronic communications of a user are monitored and analyzed with respect to the electronic device and user attributes. Linguistic patterns associated with the electronic communications are determined and with respect to additional electronic communications of said user and a weighted prioritization list of the common terms is generated and electronic dictionary software is modified accordingly. A specified electronic communication currently being entered into the electronic device is monitored and each term of the specified electronic communication is analyzed. In response to the analysis, suggested terms for entering within the specific electronic communication are presented via a graphical user interface of the electronic device.

18 Claims, 6 Drawing Sheets

(51) Int. Cl.
*G10L 15/26* (2006.01)
*G06F 16/9032* (2019.01)
*G06F 16/9038* (2019.01)
*G10L 15/06* (2013.01)
*G06F 40/205* (2020.01)
*G06F 40/242* (2020.01)

(52) U.S. Cl.
CPC .......... *G06F 40/205* (2020.01); *G06F 40/242* (2020.01); *G10L 15/063* (2013.01); *G10L 15/26* (2013.01); *G10L 2015/0635* (2013.01)

(58) Field of Classification Search
USPC ......................................... 715/256, 259, 254
See application file for complete search history.

(56) References Cited

U.S. PATENT DOCUMENTS

| | | | |
|---|---|---|---|
| 7,953,219 B2 | 5/2011 | Freedman | |
| 8,346,563 B1 | 1/2013 | Hjelm | |
| 8,903,716 B2 | 12/2014 | Chen | |
| 8,990,235 B2 | 3/2015 | King | |
| 9,142,219 B2 | 9/2015 | Mozer | |
| 9,916,299 B2* | 3/2018 | Eck | G06Q 50/01 |
| 10,049,656 B1* | 8/2018 | Barton | G10L 15/183 |
| 10,186,255 B2* | 1/2019 | Tapuhi | G06N 20/00 |
| 10,402,493 B2* | 9/2019 | Spencer | G10L 15/183 |
| 10,423,240 B2* | 9/2019 | Ryu | G06F 3/018 |
| 10,445,424 B2* | 10/2019 | Medlock | G06F 3/04886 |
| 10,558,749 B2* | 2/2020 | Hwang | G06F 40/242 |
| 2009/0083295 A1* | 3/2009 | Minamino | G06F 16/289 |
| 2010/0185444 A1 | 7/2010 | Olsen | |
| 2011/0060590 A1 | 3/2011 | Katae | |
| 2013/0132073 A1 | 5/2013 | Lowles | |
| 2014/0208258 A1 | 7/2014 | Yuen et al. | |
| 2014/0267045 A1* | 9/2014 | Grieves | G06F 40/242 |
| | | | 345/168 |
| 2014/0317502 A1 | 10/2014 | Brown | |
| 2015/0229756 A1 | 8/2015 | Raniere | |
| 2016/0241671 A1* | 8/2016 | Goel | H04L 67/306 |
| 2016/0316059 A1 | 10/2016 | Nuta | |
| 2017/0060962 A1* | 3/2017 | Halim | G06F 16/2477 |
| 2017/0132208 A1 | 5/2017 | Adavelli | |
| 2019/0230170 A1 | 7/2019 | Marlin | |

OTHER PUBLICATIONS

Lagorio-Chafkin, Christine; Even Executives at Voice-Recognition Companies Are a Little Freaked Out About Their Kids Using the Technology; Inc.com; May 30, 2018; https://www.inc.com/christine-lagorio/voice-recognition-executives-concerned-about-their-children.html; 6 pages.

Wagenseil, Paul; How to Make Sure Alexa, Google Home Don't Hear Too Much; Tom's Guide; Apr. 23, 2018; https://www.tomsguide.com/us/alexa-google-home-privacy,news-27038.html; 6 pages.

Friedman, Mark J.; List of IBM Patents or Patent Applications Treated as Related; May 15, 2019; 1 page.

* cited by examiner

GROUP PATTERN BASED ELECTRONIC DICTIONARY MODIFICATION AND PRESENTATION

FIELD

The present invention relates generally to a method for modifying electronic dictionary functionality and in particular to a method and associated system for improving software and memory technology associated with monitoring audible and text-based electronic communications retrieving audible communications, modifying electronic dictionary software based on audience attributes, and presenting suggested terms for entering within a specific electronic communication.

BACKGROUND

Accurately monitoring audio to text conversion typically includes an inaccurate process with little flexibility. Modifying text conversion software associated with display interface presentation may include a complicated process that may be time consuming and require a large amount of resources. Additionally, presenting predicted term notifications may require additional human intervention.

SUMMARY

A first aspect of the invention provides a target audience based electronic dictionary modification and presentation method comprising: detecting, by a processor of an electronic device via a sensor, a communication application being enabled via the electronic device; monitoring, by the processor, electronic communications of the user with respect to the electronic device; first analyzing in real time, by the processor, the electronic communications with respect to attributes of the user; determining, by said processor based on results of said first analyzing, linguistic patterns associated with said electronic communications with respect to additional electronic communications of said user and additional target audience users; generating, by the processor based on the linguistic patterns, a weighted prioritization list of common terms communicated by the user; modifying, by the processor based on the weighted prioritization list, electronic dictionary software of the communication application resulting in generation of modified electronic dictionary software; monitoring, by the processor, a specified electronic communication currently being entered into the electronic device; second analyzing, by the processor executing the modified electronic dictionary software, each term of the specified electronic communication; and presenting based on results of the second analyzing, by the processor to the user via a graphical user interface (GUI) of the electronic device, suggested terms for entering within the specific electronic communication.

A second aspect of the invention provides a computer program product, comprising a computer readable hardware storage device storing a computer readable program code, the computer readable program code comprising an algorithm that when executed by a processor of an electronic device implements a target audience based electronic dictionary modification and presentation method, the method comprising: detecting, by the processor via a sensor, a communication application being enabled via the electronic device; monitoring, by the processor, electronic communications of the user with respect to the electronic device; first analyzing in real time, by the processor, the electronic communications with respect to attributes of the user; determining, by the processor based on results of the first analyzing, linguistic patterns associated with the electronic communications with respect to additional electronic communications of the user and additional target audience users; generating, by the processor based on the linguistic patterns, a weighted prioritization list of common terms communicated by the user; modifying, by the processor based on the weighted prioritization list, electronic dictionary software of the communication application resulting in generation of modified electronic dictionary software; monitoring, by the processor, a specified electronic communication currently being entered into the electronic device; second analyzing, by the processor executing the modified electronic dictionary software, each term of the specified electronic communication; and presenting based on results of the second analyzing, by the processor to the user via a graphical user interface (GUI) of the electronic device, suggested terms for entering within the specific electronic communication.

A third aspect of the invention provides an electronic device comprising a processor coupled to a computer-readable memory unit, the memory unit comprising instructions that when executed by the processor implements a target audience based electronic dictionary modification and presentation method comprising: detecting, by the processor via a sensor, a communication application being enabled via the electronic device; monitoring, by the processor, electronic communications of the user with respect to the electronic device; first analyzing in real time, by the processor, the electronic communications with respect to attributes of the user; determining, by the processor based on results of the first analyzing, linguistic patterns associated with the electronic communications with respect to additional electronic communications of the user; generating, by the processor based on the linguistic patterns, a weighted prioritization list of common terms communicated by the user and additional target audience users; modifying, by the processor based on the weighted prioritization list, electronic dictionary software of the communication application resulting in generation of modified electronic dictionary software; monitoring, by the processor, a specified electronic communication currently being entered into the electronic device; second analyzing, by the processor executing the modified electronic dictionary software, each term of the specified electronic communication; and presenting based on results of the second analyzing, by the processor to the user via a graphical user interface (GUI) of the electronic device, suggested terms for entering within the specific electronic communication.

The present invention advantageously provides a simple method and associated system capable of accurately monitoring audio to text for presentation.

DETAILED DESCRIPTION

Figure 1:
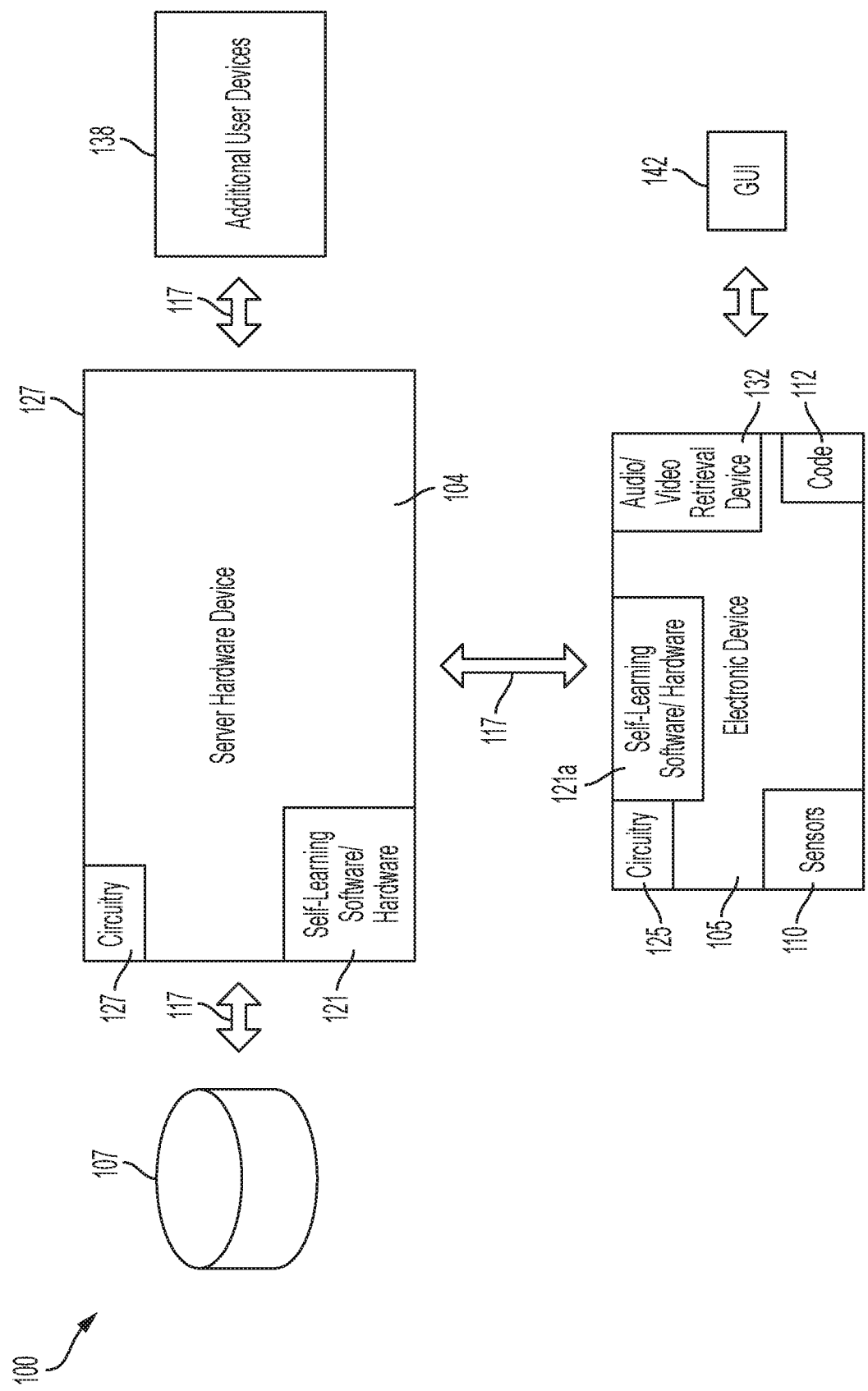
FIG. 1 illustrates a system for improving software and memory technology associated with monitoring audible and text-based electronic communications retrieving audible communications, modifying electronic dictionary software, and presenting suggested terms for entering within a specific electronic communication, modifying electronic dictionary software, and presenting suggested terms for entering within a specific electronic communication, in accordance with embodiments of the present invention.

FIG. 1 illustrates a system 100 for improving software and memory technology associated with monitoring audible and text-based electronic communications retrieving audible communications, modifying electronic dictionary software, and presenting suggested terms for entering within a specific electronic communication, in accordance with embodiments of the present invention. Individual linguistic patterns typically change based on a specified target audience with respect to transmitting communications and an associated context of the communications. Terms selected for communicating with a family member may be different than terms for use when communicating with a professional colleague. Additionally, a pattern may differ if the communication is associated with a single user or members of a group of users. A typical communication system (for communicating via text messaging or email) may include a type ahead electronic dictionary provided with software tools for texting while providing recommended words with respect to text-based communications. A typical look ahead electronic dictionary may not include terms that relate to specific audience-based terms. Likewise, a user may request to access to specialized audience related terms instead of a generic device-based list. Therefore, system 100 enables an improved process for generating a customized electronic dictionary associated with specified terminology of a specified target audience.

System 100 enables a process for capturing linguistic patterns and associated word selections (i.e., for audible or written communications) associated with use by an individual or a group of individuals. The process for capturing and analyzing the linguistic patterns and associated word selections for pattern matching is executed based on an approval by the user. The approval may additionally include a user's option to cancel such capturing and analyzing, and thus opt/in and opt/out of capturing and analyzing communications at the user's discretions. Further, any data collected is understood to be intended to be securely stored and unavailable without authorization. Likewise, an approval may additionally include a group of user's options to cancel such capturing and analyzing, and thus opt/in and opt/out of capturing and analyzing communications at the group of user's discretions.

In response, an electronic dictionary is modified for enabling a type-ahead selection comprising prioritized words. Likewise, warnings are trigged when non-desired words are associated with the electronic dictionary. The aforementioned process is configured to speed up a communication process by: providing an improved match for a word being typed and providing a filter for words that are not relevant.

System 100 is configured to modify recommended type-ahead selection capabilities of a device based on a target audience for communications as follows:

Linguistic patterns are captured from previous communication interactions (via a communication device) with individuals. Words that have been defined as articles or unusable words are removed from an electronic dictionary and a weighted prioritization list of words is generated based on a communication audience of the individuals. Likewise, a type-ahead list (of words) is supplemented with newly weighted prioritized words exceeding a pre-configured threshold and unusable words are detected for providing warnings based on the communication audience.

System 100 enables the following functionality:

1. Designating a device (comprising an integrated microphone) for capturing vocal conversations of a user and a text history of a device of the user.
2. Capturing a vocal conversation and text history of the user.
3. Determining linguistic patterns associated with the vocal conversation and text history of the user.
4. Generating a weighted prioritization word list based on the determined linguistic patterns. The weighted prioritization word list is configured to indicate weighted words with respect to an anticipated audience. The weighted words are prioritized for usage based on the weighting.
5. Receiving a text conversation (initiated by the user on a display of the device) via the device.
6. Converting the vocal conversation to text format.
7. Analyzing the vocal conversation with respect to the text conversation for generation of text suggestions (for typing into a GUI of the device) based on the vocal conversation. The text suggestions are generated based on a linguistic style, word preferences, and phrase patterns. The text suggestions are inputted into the text conversation (via the GUI) based on the analysis of the vocal conversation. Additionally, the text suggestions may be suggestions for avoiding specified words.
8. Suggesting words in a text conversation on the display of the device based on the analysis of the vocal conversation.

System 100 of FIG. 1 includes a server hardware device 104 (i.e., specialized hardware device), an electronic device 105 (including a GUI 142), additional user devices 138, and a database 107 (e.g., a cloud-based system) interconnected through a network 117. Server hardware device 104 includes specialized circuitry 127 (that may include specialized software) and self-learning software code/hardware structure 121 (i.e., including self-learning software code). Electronic device 105 and additional user devices 138 may include personal devices provided to each user. Electronic device 105 and additional user devices 138 may be Bluetooth enabled to provide connectivity to any type of system. Electronic device 105 includes self-learning software code/hardware structure 121a (e.g., integrated with self-learning software code/hardware structure 121), specialized circuitry 125 (that may include specialized software), audio/video retrieval device 132, sensors 110, and code 112 (including configuration code and generated self-learning software code for transfer to/from server hardware device 104). Sensors 110 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, etc. Server hardware device 104, electronic device 105, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, electronic device 105, and database 107 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and memory technology associated with monitoring audible and text-based electronic communications retrieving audible communications, modifying electronic dictionary software, and presenting suggested terms for entering within a specific electronic communication. Audio/video retrieval device 132 may comprise any type of audio/video device including, inter alia, a camera with gaze point tracking hardware and software, a video camera, a still shot camera, etc. Gaze point tracking comprises a process for tracking motion of an eye by measuring either the point of gaze (i.e., a direction that a user is viewing). Gaze point tracking hardware comprises a device for measuring eye positions and eye movement. Network 117 may include any type of network including, inter alia, a local area network, (LAN), a wide area network (WAN), the Internet, a wireless network, etc. Alternatively, network 117 may include an application programming interface (API).

The following implementation examples describe a system implementing processes for improving a type-ahead dictionary based on an audience of an individual:

A first example is associated with a first user and associated friends that frequently use specified words that are unique to a specified group of individuals. A process is initiated the first user is enabling a text conversation with a second user. The first and second users frequently use specified new words in their written and oral conversations. Therefore, when the first user is texting with friends (including the second user) and the system detects that he/she prefers to express positive feedback to a friend, the system may automatically recommend specified words such as "Savage" or "Gucci". For example, as the first user begins typing an "S" or "G" to inform a friend of a positive topic being discussed, the system is configured to determine that the aforementioned two words are unique to the audience and presents the recommend specified words "Savage" or "Gucci".

A second example is associated with a first user that has a new baby in the family that was just born this year. The first user frequently discusses (via phone conversations) the baby with his wife. Likewise, the first user is traveling on business he uses test messages for discussion. Therefore, the system is configured to predict the usage of the word "Baby" any time a letter "B" is typed into a text message. Additionally, the first user frequently discusses diapers as well. Therefore, the system is configured to recommend the word "Diapers" anytime the letter D is used. The system comprises a self-learning system such that based on a frequency of use of specified words (e.g., as the baby grow and no longer needs diapers), the predicted word is eliminated from the system.

System 100 enables processes for capturing linguistic patterns, filtering specified words, generating weighted priority words, and supplementing a type ahead electronic dictionary.

The process for capturing linguistic patterns includes capturing audio and written communications with specified individuals. Associated devices (e.g., electronic device 105) are registered with system 100 for capturing audio communications and transmitting text converted content to system 100 (e.g., server hardware device 104). Verbal communications are captured based on a voice print, near field communications with another device, or analysis of the video feed. Textual content is captured from applications used for written communications and specified words are stored within a specialized personal repository linked to a specified audience.

The process for filtering specified words includes: removing specified words from the specialized personal repository; removing articles from a supplemental list, removing banned words from a GUI; adding words preferred words in system; and removing words based on a temporal limit (e.g., a configured attribute).

The process for generating weighted priority words includes prioritizing words based on a frequency of use and recently used periods associated with individuals and groups of individuals. System 100 reviews words based on a targeted audience. For each word, a frequency and recently used period is detected via configurable parameter weighting attributes such that words detected to be used within a very close time period window are assigned a significant boost with respect to a rating. Subsequently, all words are sorted by weighting attributes. The process for supplementing a type ahead electronic dictionary includes modifying a priority of a generic electronic type-ahead dictionary such that all banned words are excluded from a type-ahead recommendation based on an audience. If a banned word is used without the type-ahead feature, a warning is displayed to the individual initiating the communications. Supplemental words are prioritized with respect generic words based on an audience and a threshold of use with respect to a targeted audience. Social network, corporate directories, and chat members are used to identify a linkage between multiple individuals and individual clusters (e.g. work vs family).

The following steps associated with electronic device 105 describe implementation processes for improving an electronic type-ahead dictionary enabled via electronic applications (e.g., texting software):

1. Linguistic patterns used by an individual are captured (via oral and written communications) and stored via an enabled communication device (e.g., a cellular phone).
2. A supplemental list comprising personalized words is generated. The personalized words are for use and exclusion (in a type ahead electronic dictionary) based on historical communications between a specified individual and an identified group of individuals.
3. Specified words are prioritized for supplementing an existing electronic dictionary.
4. Word used are modified by a type-ahead application based on communications with the specified individual.

5. A supplemental list of personalized words (for an electronic dictionary) is generated.

6. Specified terms or words may be removed from or added to the supplemental list. The specified words or terms may be added or removed based on frequency of usage, importance, timing of usage, user preference (e.g., entered via GUI 142), etc.

Figure 2:
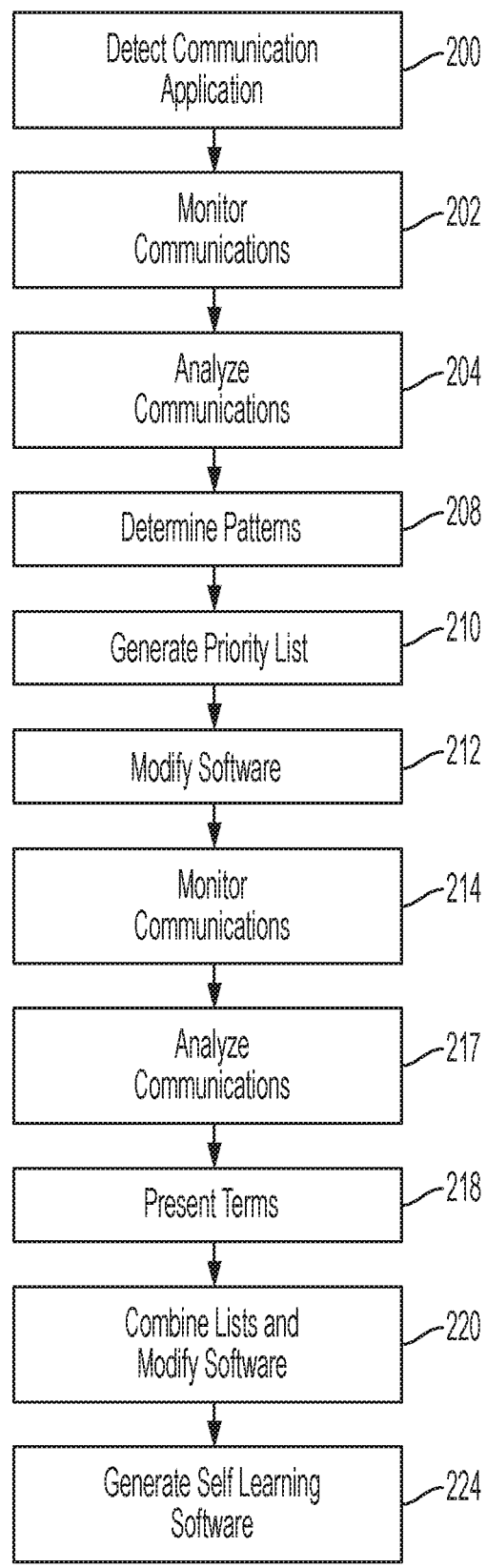
FIG. 2 illustrates an algorithm detailing a process flow enabled by the system of FIG. 1 for improving software and memory technology associated with monitoring audible and text-based electronic communications retrieving audible communications, modifying electronic dictionary software, and presenting suggested terms for entering within a specific electronic communication, in accordance with embodiments of the present invention.

FIG. 2 illustrates an algorithm detailing a process flow enabled by system 100 of FIG. 1 for improving software and memory technology associated with monitoring audible and text-based electronic communications retrieving audible communications, modifying electronic dictionary software, and presenting suggested terms for entering within a specific electronic communication, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and electronic device 105. In step 200, a communication application being enabled is detected via a sensor of an electronic device. In step 202, electronic communications of a user are monitored with respect to the electronic device. The electronic communications may include, inter alia, audible voice-based communications of the user, visual text-based communications of the user, audible voice-based communications and visual text-based communications (i.e., a combination) of the user. In step 204, the electronic communications are analyzed (in real time) with respect to attributes of the user. The analysis may include identifying a group of users associated with receiving the electronic communications, and wherein said determining said linguistic patterns comprises analyzing said electronic communications with respect to said group of users.

In step 208, linguistic patterns associated with electronic communications of the user are determined (e.g., by analyzing the electronic communications with respect to the group of users). Additionally, specified terms (e.g., comprising differing linguistic patterns with respect to linguistic preferences of the user and group of users) may be removed (based on the linguistic patterns) from the weighted prioritization list.

In step 210, a weighted prioritization list of the common terms communicated by the user is generated based on the linguistic patterns. Generating the weighted prioritization list of common terms may include, inter alia:

1. Detecting a time period occurring since the user has specified each term of the common terms.
2. Retrieving the common terms from an audible signal of a visual source associated with the user.
3. Retrieving the common terms from audible voice-based communications of the user.
4. Retrieving the common terms from visual text-based communications of the user.
5. Detecting a frequency of use for each term of the common terms.

In step 212, electronic dictionary software is modified (based on the weighted prioritization list) resulting in generation of modified electronic dictionary software. In step 214, a specified electronic communication currently being entered into the electronic device is monitored. In step 217, each term of the specified electronic communication is analyzed via execution of the modified electronic dictionary software. In step 218, suggested terms for entering within the specific electronic communication are presented (in response to the analysis step 217) via a graphical user interface (GUI) of the electronic device. In step 220, the weighted prioritization list of common terms is combined with a generic list of standard terms and the modified electronic dictionary software may be modified based on the combined list resulting in generation of further modified electronic dictionary software. In step 224, self-learning software code for executing future electronic dictionary modification and presentation processes is generated based on results of steps 218 and 220.

Figure 3:
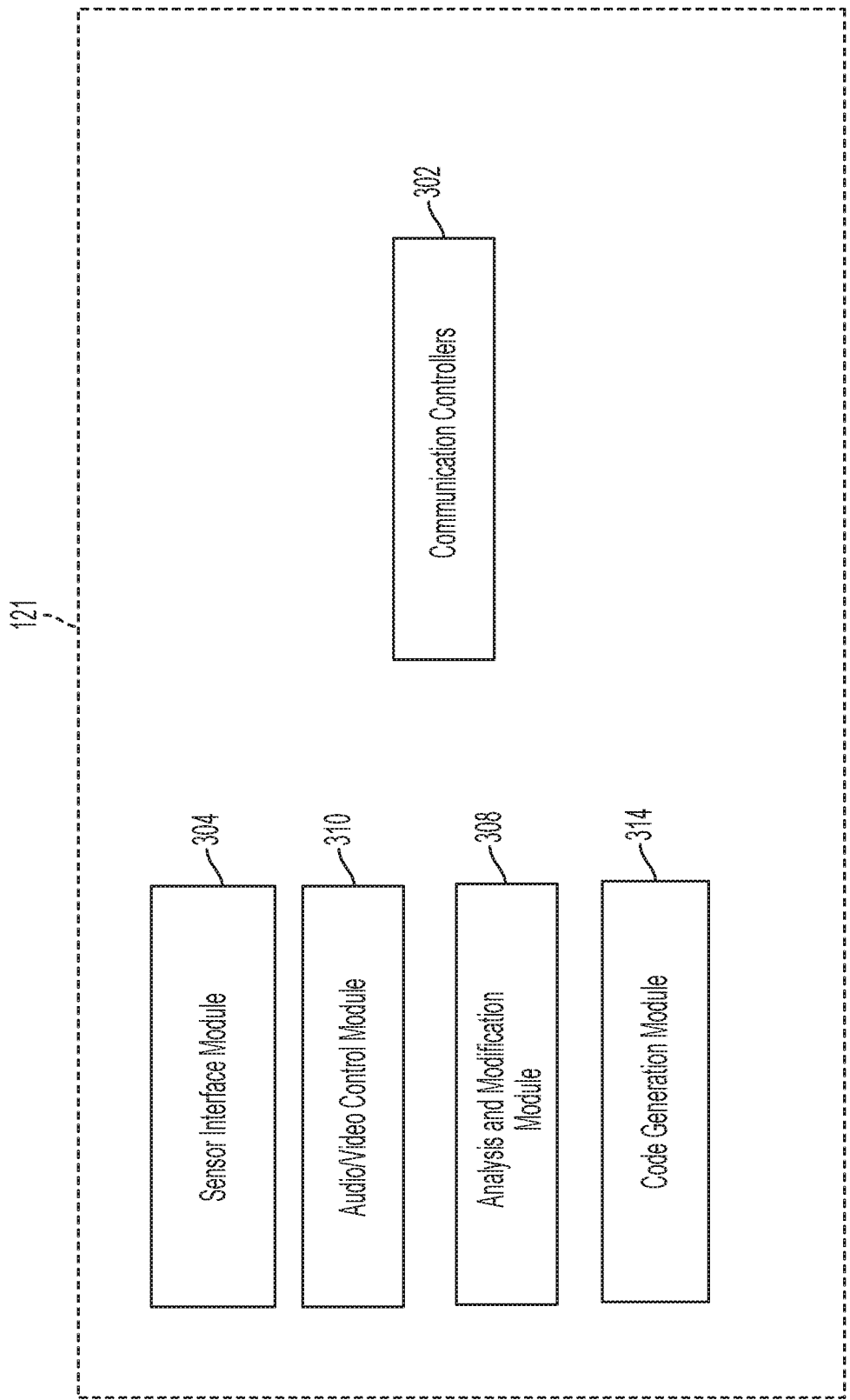
FIG. 3 illustrates an internal structural view of the self-learning software/hardware structure of FIG. 1, in accordance with embodiments of the present invention.

FIG. 3 illustrates an internal structural view of self-learning software/hardware structure 121 and/or self-learning software code/hardware structure 121a of FIG. 1, in accordance with embodiments of the present invention. Self-learning software/hardware structure 121 includes a sensor interface module 304, an audio video control module 310, an analysis and modification module 308, a code generation module 314, and communication controllers 302. Sensor interface module 304 comprises specialized hardware and software for controlling all functions related to sensors 110 of FIG. 1. Audio video control module 310 comprises specialized hardware and software for controlling all functionality related to audio video retrieval device 132 for retrieving video data and implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating self-learning software code for executing future electronic dictionary modification and presentation processes. Communication controllers 302 are enabled for controlling all communications between sensor interface module 304, audio video control module 310, analysis and modification module 308, and code generation module 314.

Figure 4:
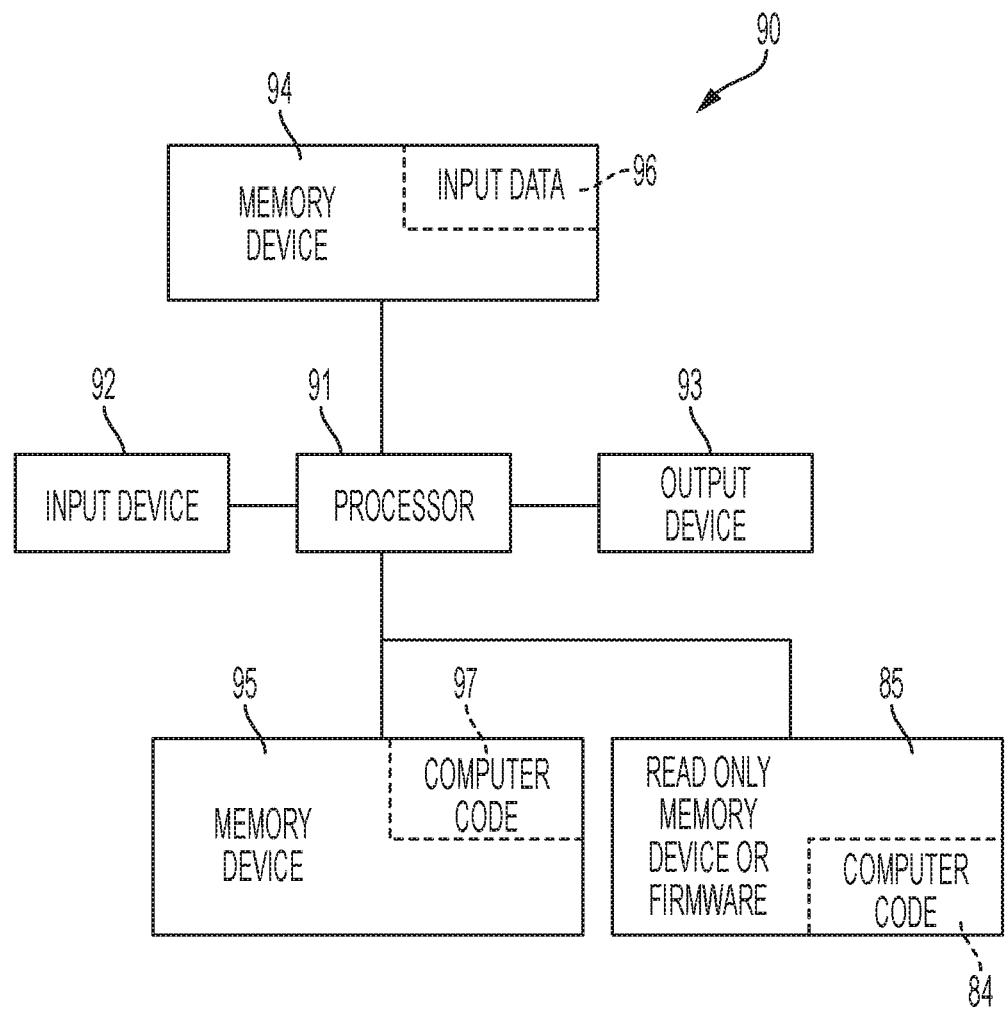
FIG. 4 illustrates a computer system used by the system of FIG. 1 for improving software and memory technology associated with retrieving audible communications, modifying electronic dictionary software, and presenting suggested terms for entering within a specific electronic communication, in accordance with embodiments of the present invention.

FIG. 4 illustrates a computer system 90 (e.g., electronic device 105 and/or server hardware device 104 of FIG. 1) used by or comprised by the system of FIG. 1 for improving software and memory technology associated with monitoring audible and text-based electronic communications retrieving audible communications, modifying electronic dictionary software, and presenting suggested terms for entering within a specific electronic communication, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and memory technology associated with monitoring audible and text-based electronic communications retrieving audible communications, modifying electronic dictionary software, and presenting suggested terms for entering within a specific electronic communication. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and memory technology associated with monitoring audible and text-based electronic communications retrieving audible communications, modifying electronic dictionary software, and presenting suggested terms for entering within a specific electronic communication. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and memory technology associated with monitoring audible and text-based electronic communications retrieving audible communications, modifying electronic dictionary software, and presenting suggested terms for entering within a specific electronic communication. In another embodiment, the invention provides a business method that performs the process steps of the invention on a subscription, advertising, and/or fee basis. That is, a service supplier, such as a Solution Integrator, could offer to enable a process for improving software and memory technology associated with monitoring audible and text-based electronic communications retrieving audible communications, modifying electronic dictionary software, and presenting suggested terms for entering within a specific electronic communication. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a configuration of hardware and software, any configuration of hardware and software, as would be known to a person of ordinary skill in the art, may be utilized for the purposes stated supra in conjunction with the computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
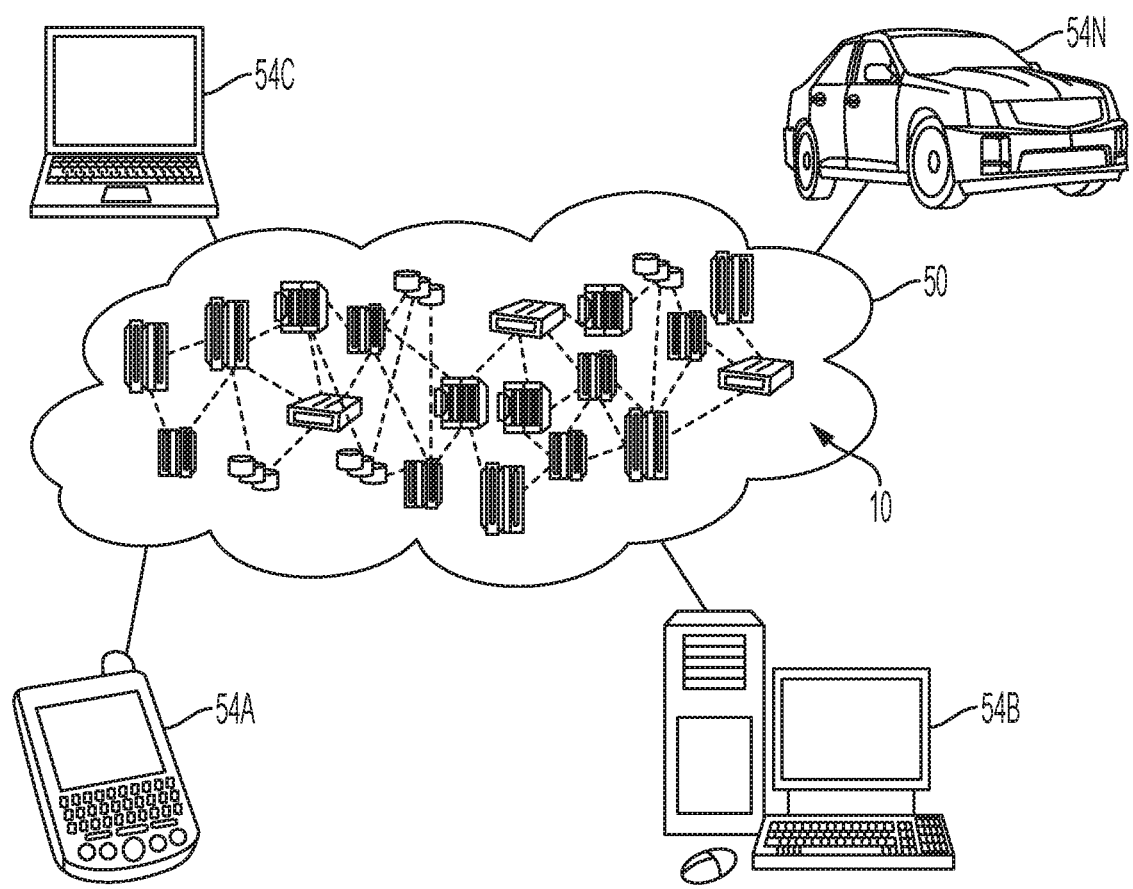
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
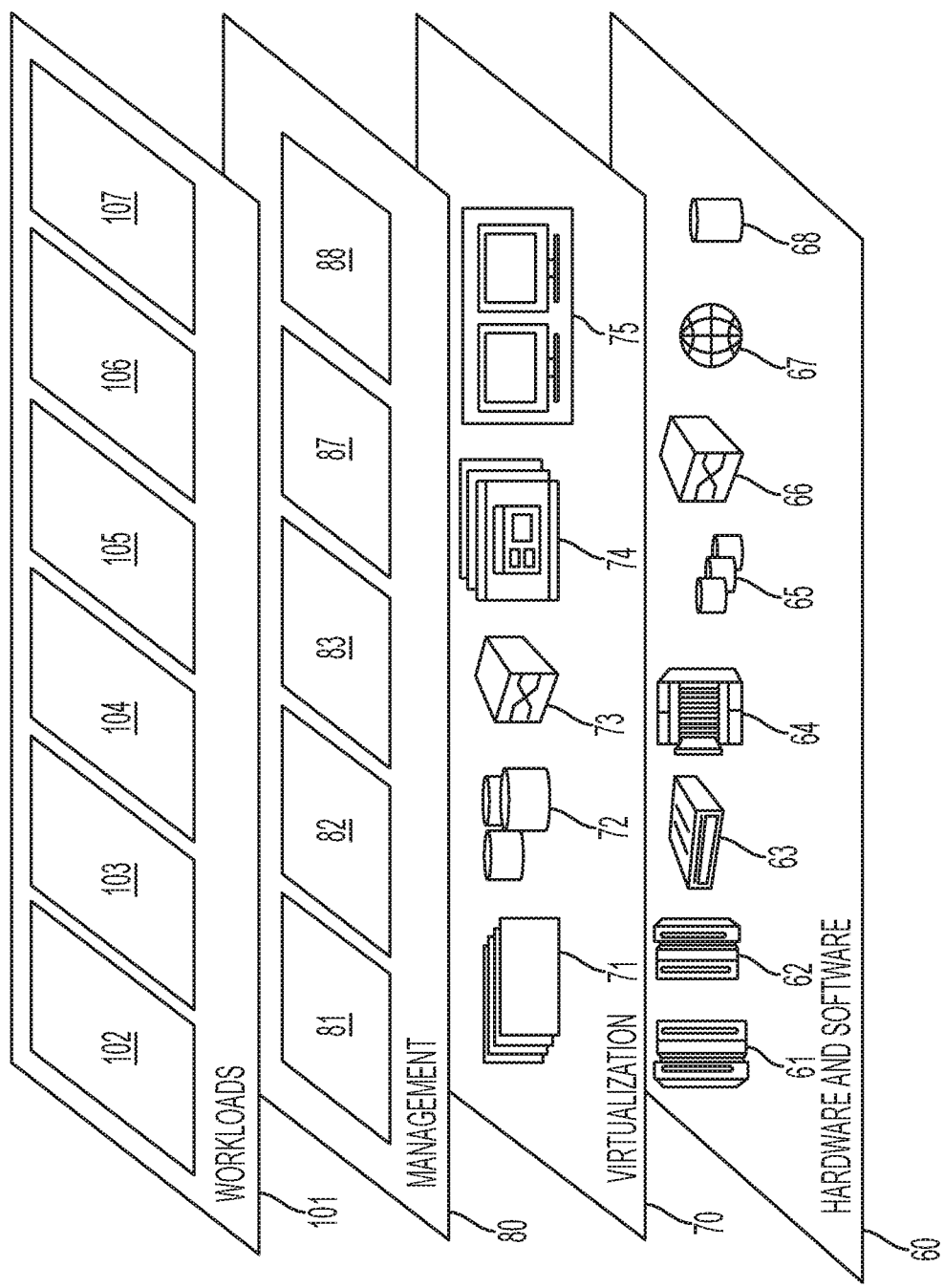
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software and memory technology associated with monitoring audible and text-based electronic communications retrieving audible communications, modifying electronic dictionary software, and presenting suggested terms for entering within a specific electronic communication 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A target audience based electronic dictionary modification and presentation method comprising:

detecting, by a processor of an electronic device via a sensor, a communication application being enabled via said electronic device;

monitoring, by said processor, electronic communications of said user with respect to said electronic device;

first analyzing in real time, by said processor, said electronic communications with respect to attributes of said user, wherein said first analyzing comprises identifying a group of users associated with receiving said electronic communications;

determining, by said processor based on results of said first analyzing, linguistic patterns associated with said electronic communications with respect to additional electronic communications of said user and additional target audience users, wherein said determining said linguistic patterns comprises analyzing said electronic communications with respect to said group of users;
generating, by said processor based on said linguistic patterns, a weighted prioritization list of common terms communicated by said user;
modifying, by said processor based on said weighted prioritization list, electronic dictionary software of said communication application resulting in generation of modified electronic dictionary software;
monitoring, by said processor, a specified electronic communication currently being entered into said electronic device;
second analyzing, by said processor executing said modified electronic dictionary software, each term of said specified electronic communication; and
presenting based on results of said second analyzing, by said processor to said user via a graphical user interface (GUI) of said electronic device, suggested terms for entering within said specific electronic communication;
removing, by said processor based on said linguistic patterns, specified terms from said weighted prioritization list of common terms, wherein said specified terms comprise terms determined to comprise differing linguistic patterns with respect to linguistic preferences of said user and said group of users; and
modifying, by said processor based on said weighted prioritization list, said modified electronic dictionary software resulting in generation of further modified electronic dictionary software.

2. The method of claim 1, wherein said electronic communications comprise audible voice-based communications of said user.

3. The method of claim 1, wherein said electronic communications comprise visual text-based communications of said user.

4. The method of claim 1, wherein said electronic communications comprise audible voice-based communications and visual text-based communications of said user.

5. The method of claim 1, wherein said generating said weighted prioritization list comprises:
retrieving said common terms from an audible signal of a visual source associated with said user.

6. The method of claim 1, wherein said generating said weighted prioritization list comprises:
retrieving said common terms from audible voice-based communications of said user.

7. The method of claim 1, wherein said generating said weighted prioritization list comprises:
retrieving said common terms from visual text-based communications of said user.

8. The method of claim 1, wherein said generating said weighted prioritization list of common terms comprises:
detecting a frequency of use for each term of said common terms.

9. The method of claim 1, wherein said generating said weighted prioritization list of common terms comprises:
detecting a time period occurring since said user has specified each term of said common terms.

10. The method of claim 1, further comprising:
combining, by said processor, said weighted prioritization list of common terms with a generic list of standard terms; and
modifying, by said processor based on said combining, said modified electronic dictionary software.

11. The method of claim 1, further comprising:
generating, by said processor based on results of said second analyzing and said presenting, self-learning software code for executing future electronic dictionary modification and presentation processes.

12. The method of claim 1, further comprising:
providing at least one support service for at least one of creating, integrating, hosting, maintaining, and deploying computer-readable code in the control hardware, said code being executed by the computer processor to implement: said detecting, said monitoring said electronic communications, said first analyzing, said determining, said generating, said modifying said specified electronic communication, said monitoring, said second analyzing, and said presenting.

13. A computer program product stored on a non-transitory computer-readable storage medium containing program instructions, the program instructions, when executed by a processor of an electronic device, implements a target audience based electronic dictionary modification and presentation method, said method comprising:
detecting, by said processor via a sensor, a communication application being enabled via said electronic device;
monitoring, by said processor, electronic communications of said user with respect to said electronic device;
first analyzing in real time, by said processor, said electronic communications with respect to attributes of said user, wherein said first analyzing comprises identifying a group of users associated with receiving said electronic communications;
determining, by said processor based on results of said first analyzing, linguistic patterns associated with said electronic communications with respect to additional electronic communications of said user and additional target audience users, wherein said determining said linguistic patterns comprises analyzing said electronic communications with respect to said group of users;
generating, by said processor based on said linguistic patterns, a weighted prioritization list of common terms communicated by said user;
modifying, by said processor based on said weighted prioritization list, electronic dictionary software of said communication application resulting in generation of modified electronic dictionary software;
monitoring, by said processor, a specified electronic communication currently being entered into said electronic device;
second analyzing, by said processor executing said modified electronic dictionary software, each term of said specified electronic communication; and
presenting based on results of said second analyzing, by said processor to said user via a graphical user interface (GUI) of said electronic device, suggested terms for entering within said specific electronic communication;
removing, by said processor based on said linguistic patterns, specified terms from said weighted prioritization list of common terms, wherein said specified terms comprise terms determined to comprise differing linguistic patterns with respect to linguistic preferences of said user and said group of users; and
modifying, by said processor based on said weighted prioritization list, said modified electronic dictionary software resulting in generation of further modified electronic dictionary software.

14. The computer program product of claim 13, wherein said electronic communications comprise audible voice-based communications of said user.

15. The computer program product of claim 13, wherein said electronic communications comprise visual text-based communications of said user.

16. The computer program product of claim 13, wherein said electronic communications comprise audible voice-based communications and visual text-based communications of said user.

17. The computer program product of claim 13, wherein said generating said weighted prioritization list comprises:
 retrieving said common terms from an audible signal of a visual source associated with said user.

18. An electronic device comprising a processor coupled to a computer-readable memory unit, said memory unit comprising instructions that when executed by the processor implements a target audience based electronic dictionary modification and presentation method comprising:
 detecting, by said processor via a sensor, a communication application being enabled via said electronic device;
 monitoring, by said processor, electronic communications of said user with respect to said electronic device;
 first analyzing in real time, by said processor, said electronic communications with respect to attributes of said user, wherein said first analyzing comprises identifying a group of users associated with receiving said electronic communications;
 determining, by said processor based on results of said first analyzing, linguistic patterns associated with said electronic communications with respect to additional electronic communications of said user and additional target audience users, wherein said determining said linguistic patterns comprises analyzing said electronic communications with respect to said group of users;
 generating, by said processor based on said linguistic patterns, a weighted prioritization list of common terms communicated by said user;
 modifying, by said processor based on said weighted prioritization list, electronic dictionary software of said communication application resulting in generation of modified electronic dictionary software;
 monitoring, by said processor, a specified electronic communication currently being entered into said electronic device;
 second analyzing, by said processor executing said modified electronic dictionary software, each term of said specified electronic communication; and
 presenting based on results of said second analyzing, by said processor to said user via a graphical user interface (GUI) of said electronic device, suggested terms for entering within said specific electronic communication;
 removing, by said processor based on said linguistic patterns, specified terms from said weighted prioritization list of common terms, wherein said specified terms comprise terms determined to comprise differing linguistic patterns with respect to linguistic preferences of said user and said group of users; and
 modifying, by said processor based on said weighted prioritization list, said modified electronic dictionary software resulting in generation of further modified electronic dictionary software.

* * * * *